(12) United States Patent
Baumgartner et al.

(10) Patent No.: US 8,467,746 B2
(45) Date of Patent: Jun. 18, 2013

(54) METHOD AND DEVICE FOR SENDING TRANSMISSION SIGNAL, IN PARTICULAR MOBILE RADIO SIGNAL

(75) Inventors: Bernd Baumgartner, Giengen (DE); Bjoern Jelonnek, Ulm (DE); Armin Splett, Ulm (DE); Gunter Wolff, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 851 days.

(21) Appl. No.: 12/449,178

(22) PCT Filed: Jan. 30, 2008

(86) PCT No.: PCT/EP2008/051160
§ 371 (c)(1),
(2), (4) Date: Dec. 18, 2009

(87) PCT Pub. No.: WO2008/092916
PCT Pub. Date: Aug. 7, 2008

(65) Prior Publication Data
US 2011/0075575 A1    Mar. 31, 2011

(30) Foreign Application Priority Data
Jan. 30, 2007    (EP) .................................... 07002016

(51) Int. Cl.
*H04B 1/04*        (2006.01)
(52) U.S. Cl.
USPC .......... 455/114.2; 455/33.1; 455/67.1; 455/69
(58) Field of Classification Search
USPC ....................................... 455/114.2
See application file for complete search history.

(56) References Cited

U.S. PATENT DOCUMENTS

| | | | | |
|---|---|---|---|---|
| 5,386,589 A * | 1/1995 | Kanai | ........................... | 455/423 |
| 6,038,261 A | 3/2000 | Mestdagh | | |
| 2004/0005014 A1* | 1/2004 | Talwar et al. | ................. | 375/295 |

FOREIGN PATENT DOCUMENTS
WO      2004/006464 A1    1/2004

* cited by examiner

*Primary Examiner* — Ajibola Akinyemi
(74) *Attorney, Agent, or Firm* — Staas & Halsey LLP

(57) ABSTRACT

In sending a transmission signal, in particular a mobile radio signal, to a receiver, the transmission signal is processed according to a modulation coding scheme MCS and subjected to amplitude limited to obtain a specified ratio of maximum to average transmission power PAR. A limit value EVM for an error in the transmission signal is matched to transmission conditions for the transmission signal, according to demand, in such a way that a maximum signal to interface ration is achieved at a receiver.

19 Claims, 9 Drawing Sheets

METHOD AND DEVICE FOR SENDING TRANSMISSION SIGNAL, IN PARTICULAR MOBILE RADIO SIGNAL

CROSS REFERENCE TO RELATED APPLICATIONS

This application is a U.S. national stage of International Application No. PCT/EP2008/051160, filed Jan. 30, 2008 and claims the benefit thereof. The International Application claims the benefit of European Application No. 07002016.9 filed on Jan. 30, 2007, both applications are incorporated by reference herein in their entirety.

BACKGROUND

Described below is a method for transmission of a transmission signal, in particular of a mobile radio signal.

Modern mobile radio standards make use of high-quality modulation methods, such as QPSK (Quadrature Phase Shift Keying), 8PSK (Phase Shift Keying) or 16QAM (Quadrature Amplitude Modulation). In these modulation methods, symbols are transmitted with more than two possible information states. In this case, constancy of the instantaneous transmission power is dispensed with in favor of the higher data transmission rates.

Even greater variation of the instantaneous transmission power results from the use of multicarrier systems. In multicarrier systems, for example mobile radio standards based on OFDM (Orthogonal Frequency Division Multiplexing) and OFDMA (Orthogonal Frequency Division Multiple Access), or multicarrier GSM (Global System for Mobile Communication), a plurality of modulated individual carriers are combined to form one overall signal.

Depending on the modulation method and the combination of the individual carriers, the maximum instantaneous power of a transmission signal in multicarrier systems may therefore be considerably greater than the average value of the transmission power. The ratio of the maximum to the average transmission power is referred to as the peak to average ratio (PAR) or peak to average power ratio (PAPR) (PAR 1> and PAPR>1).

If the PAR is relatively high, the transmission amplifier in a transmission system has to keep considerable drive reserves available in order to avoid non-linear distortion of the transmission signal, for example because of limiting (clipping) effects. This increases the complexity and the power consumption of the amplifier; furthermore, the efficiency of the overall system is reduced. This in turn limits the available transmission power and range of the transmission device.

In order to reduce the peak power, it is possible to use methods in which the amplitude of signal peaks is limited (clipping). This adds an error to the signal, which becomes greater the greater the extent to which the peak power is reduced. Reduction methods such as these can be assisted by intelligent transmission modes in which transmission capacity is deliberately kept free or is filled with unusable signals, such that the PAR falls.

In order to restrict the requirements for the transmission amplifier, DE 102 19 318 A1 discloses a method for forming a carrier-frequency output signal with n signal elements in a base frequency band, in which each individual one of the n signal elements is respectively associated with one main branch as an input signal and is amplitude-limited, filtered and converted to an intermediate-frequency signal element. The intermediate-frequency n signal elements are combined as output signals from the main branches to form a joint sum signal. The sum signal is amplitude-limited, converted from digital to analog, and converted to the carrier-frequency output signal. In addition, each signal element is passed into a secondary branch, with the aid of which signal peaks to be expected in the signal element in the corresponding main branch are determined as estimated values. Amplitude limiting processes which are in each case carried out in the main branch of the corresponding signal elements in the main branch are controlled with the aid of the estimated values.

SUMMARY

One aspect of the method for transmission of a transmission signal, in particular of a mobile radio signal, is to increase data throughput and range.

One major aspect is that the available transmission power can be increased if the PAR of the transmission signal is reduced by clipping. On the one hand, a higher transmission power reduces the influence of noise and interference power at the receiver end, while on the other hand clipping increases the signal error power of the transmitter. The two effects have an influence in opposite senses on the overall C/I (Carrier-to-Interference ratio) at the receiver end. The method uses this fact for optimization, in particular for requirement-based matching of a limit value (EVM) for an error in the transmission signal to transmission conditions for the transmission signal. The limit value is therefore not permanently predetermined, according to the method, but may be flexibly determined and matched, corresponding to the current transmission conditions or requirements. The transmission conditions, in particular radio conditions, may be transmission factors, such as the priority of a channel, the load level in a radio cell, the reception conditions or guaranteed minimum data rates. These conditions may vary continuously during operation of the apparatus for transmission. The transmission power can be varied over a relatively wide range with the aid of an optimally matched EVM and the ratio that results from this of the maximum to the average transmission power (PAR). This allows unavoidable interference to be distributed more specifically, and avoidable interference to be reduced. Furthermore, if relatively strong interference is possible, longer ranges or higher data rates can be achieved and, if high data rates can be achieved without problems, lower interference can be achieved. In addition, the transmission signal can be matched so as to optimize the signal to noise ratio of the transmission signal at a receiver which is receiving the transmission signal.

The approach makes it possible to use lower-power and therefore lower-cost amplifiers in the transmitter. Despite the use of amplifiers such as these, the same average output power can be achieved as that of known systems, without disturbing loss of signal quality.

The transmission signal which is produced by the apparatus may be a transmission signal in a multicarrier system in which higher-quality modulation methods, such as QPSK, 8PSK or 16QAM are used, with more than two possible information states for each transmission symbol. The transmission signal may have a plurality of subcarriers. The transmission power of the signals on the subcarriers can be regulated and limited separately from one another. In this case, limiting a signal means that peak values of the signal, and therefore the ratio of the maximum to the average transmission power of the signal are reduced. The reduced signal therefore corresponds to the original signal, although its amplitude and transmission power can be reduced.

According to one embodiment, a method is specified for transmission of a transmission signal, in particular of a mobile radio signal, to a receiver, in which the transmission signal is processed in accordance with a modulation coding scheme MCS and is subjected to amplitude limiting in order to achieve a predetermined ratio between the maximum and the average transmission power PAR, and in which a limit value EVM for an error in the transmission signal is matched as required to the transmission conditions for the transmission signal so as to achieve a maximum carrier to interference ratio C/I at a receiver.

According to a further embodiment, one transmission condition can be a minimum transmission power for a fixed predetermined carrier to interference ratio (C/I) at a receiver, and the limit value EVM for an error in the transmission signal can be set to virtually zero.

According to a further embodiment, one transmission condition can be a carrier to interference ratio C/I to be maximized at the receiver for a fixed predetermined peak value to noise ratio PNR, and the optimum limit value for an error in the transmission signal EVM is determined as follows:
(a) determination of the relationship between the error in the transmission signal EVM and the predetermined ratio of the maximum to the average transmission power PAR in the transmitter,
(b) determination of the maximum carrier to interference ratio C/I at the receiver and of the associated error in the transmission signal $EVM^2$ for an undefined, fixed value of the peak value to noise ratio $PNR_{RX}$ at the receiver,
(c) association of the error in the transmission signal $EVM^2$ as obtained from the optimization in b) as a limit value for the maximum carrier to interference ratio C/I at the receiver, and
(d) repetition of (b) and (c) for different values of the peak value to noise ratio $PNR_{RX}$.

According to a further embodiment, the load level in a radio cell is estimated using a parameter load L=0% . . . 100%, in order to decide on appropriate measures for access control (admission control), overload control (congestion control) or sequence control (scheduling), and the parameter load can be used in order to preset the limit value for an error $EVM_{TX}$ of the transmitter.

According to a further embodiment, the limit value for an error $EVM_{TX}$ of the transmitter can be obtained using the formula:

$$EVM_{TX}=EVM_{TX,0}+(EVM_{TX,100}-EVM_{TX,0})\times(L/100\%)$$

where $EVM_{TX,0}$ and $EVM_{TX,100}$ represent the permissible limit value of an error EVM for a minimum load and maximum load, respectively.

A further embodiment relates to an apparatus for transmission of a transmission signal to a receiver, including
  a power regulator for regulation of a transmission power of an intermediate frequency signal as a function of a power parameter;
  a limiter for limiting the transmission power of the intermediate frequency signal as a function of a limit parameter, wherein the transmission signal can be produced from the intermediate frequency signal;
  a monitoring unit, which is designed to use an optimization rule to determine a limit value for an error in the transmission signal as a function of transmission factors, and to determine at least the power parameter from the limit value such that the transmission signal is matched to the limit value.

According to one embodiment, the monitoring unit may be designed to determine not only the power parameter but also the limit parameter such that the transmission signal is matched to the limit value. Since both the regulation of the transmission power and the limiting of the transmission power of the transmission signal are carried out as a function of the limit value, the transmission signal can be matched even more exactly to the respective transmission channels, in particular radio links with their corresponding transmission factors.

According to a further embodiment, the apparatus for transmission furthermore may have a modulator which is designed to modulate a baseband signal as a function of a modulation parameter and to produce this as the intermediate frequency signal, wherein the monitoring unit is also designed to determine the modulation parameter from the limit value. Coding can be carried out in addition to the modulation. Control of the modulation and coding of the transmission signal as a function of the limit value offer a further possible way to match the transmission signal to the respective transmission channel, in particular the respective radio link.

The apparatus furthermore may have a digital/analog converter, a step-up mixer and a transmission amplifier, in order to produce the transmission signal from the intermediate frequency signal.

The optimization rule may be based on the fact that a relative error energy at the receiver results from the formula:

$$1/(C/I)_{min}>1/(C/I)=1/SNR_{RX}+EVM_{TX}^2$$

and in that $SNR_{RX}$, the signal to noise ratio at the receiver for errors which do not originate from the apparatus for transmission is scaled directly with an average transmission power of the transmission signal. In this case $(C/I)_{min}$ is the minimum required carrier to interference ratio, $SNR_{RX}$ is the signal to noise ratio at the receiver, and $EVM_{TX}$ is the error limit value in the apparatus for transmission. The signal to noise ratio of the transmission signal at the receiver can be optimized by adaptation of this error limit value.

According to one embodiment, the average transmission power of the transmission signal may be one of the transmission factors, and the optimization rule can reduce the limit value when the average transmission power is reduced, and may increase the limit value when the average transmission power is increased.

The limit value can be determined in accordance with the optimization rule in order to achieve a minimum transmission power of the transmission signal for a predetermined carrier to noise ratio, using the formulae:

$$EVM_{TX}=EVM_{Analog}, \text{ and}$$

$$1/(C/I)=1/SNR_{RX}+EVM_{Analog}^2$$

In this case, $EVM_{Analog}$ is the limit value in an analog part of the apparatus for transmission.

According to a further embodiment, the limit value can be determined in accordance with the optimization rule in order to achieve a maximum carrier to interference ratio for a predetermined peak to noise ratio using the formula:

$$1/(C/I)=1/SNR_{RX}+EVM^2=PAR_{TX}/PNR_{RX}+EVM_{TX}^2$$

In this case, $PAR_{TX}$ is the ratio of the maximum to the average transmission power, and $PNR_{RX}$ is the peak to noise ratio of the signal power at the receiver.

According to a further embodiment, the monitoring unit may be designed to determine a relationship between the square of the limit value $EVM^2$ and a required carrier to interference ratio C/I, in order in a first step, to determine a relationship between the square of the limit value and the ratio of the maximum to the average transmission power $EVM^2$ (PAR) for the apparatus for transmission, in a second step, to determine a maximum carrier to interference ratio C/I for a predetermined peak to noise ratio value at the receiver (PNR$_{RX}$ value), in a third step, to associate the square of the limit value with the signal to noise ratio from the determination in the second step and, in a fourth step, to repeat the second step and the third step for different peak to noise ratio values at the receiver. An optimization process such as this is expedient when the transmission power is intended to be increased for poor reception conditions or high-priority services.

It may be possible to couple the monitoring unit to a memory, wherein the memory may have a relationship between the ratio of the maximum to the average transmission power PAR and the limit value for the maximum permissible error in the transmission signal EVM, as well as values for an associated maximum signal to noise ratio. Furthermore, the memory may have limit parameters for passing on to the limiter.

Furthermore, the apparatus may have a management unit for estimation of a load level of a radio cell in which the apparatus for transmission is arranged, with the load level being a transmission factor and with the management unit designed to pass the load level to the monitoring unit. The limit value can accordingly be determined by using the formula:

$$EVM_{TX} = EVM_{TX,0} + (EVM_{TX,100} - EVM_{TX,0}) \times (L/100\%).$$

In this case, $EVM_{TX,0}$ is the permissible limit value for minimum load, $EVM_{TX,100}$ is the permissible limit value for maximum load, and L is the load level in the radio cell. This allows the limit value to be quickly matched to changing radio conditions.

According to one embodiment, the modulator may be designed to modulate a plurality of baseband signals as a function of a plurality of modulation parameters and to produce them as a plurality of intermediate frequency signals. The monitoring unit may also be designed to determine the plurality of modulation parameters from the limit value. The apparatus may have a combiner which is designed to combine the plurality of intermediate frequency signals and to pass them as an intermediate frequency signal to the power regulator. This is advantageous when using the apparatus for transmission in a multicarrier system, in which a plurality of modulated individual carriers are combined to form one overall signal.

According to a further embodiment, the apparatus for transmission may have a plurality of power regulators for regulation of a respective transmission power of the plurality of intermediate frequency signals as a function of a plurality of power parameters. The monitoring unit may also be designed to determine the plurality of power parameters from the limit value. This allows individual signal elements of the transmission signal to be individually matched to the transmission conditions, in particular radio conditions.

According to one alternative embodiment, the apparatus may have a combiner which is designed to combine the plurality of intermediate frequency signals and to pass them as the intermediate frequency signal to the limiter. The limiter may already have the limit parameter. In this case, there is no need for the monitoring unit to provide the limit parameter. Furthermore, the limiter may be designed to limit a respective transmission power of the plurality of intermediate frequency signals as a function of a plurality of limit parameters, and to pass on a plurality of transmission signals.

Further advantages and application options will become evident from the following description in conjunction with the exemplary embodiments which are illustrated in the drawings.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Identical and/or functionally identical elements may be provided with the same reference symbols in the following text. Absolute parameter details are only exemplary details and should not be considered as being restrictive for the method described herein. The indexes RX and TX which are used for some of the details in the following description mean receiver-end and transmitter-end, respectively.

In information technology transmission methods, a limit value for a maximum permissible error in the transmission signal (EVM: error vector magnitude or RCE: relative constellation error) may be specified, in particular in the respective mobile radio standard, as a function of the modulation and coding scheme (MCS) that is used. This limit value is based on an at least required carrier to interference ratio $(C/I)_{min}$ for the reception of a signal with the MCS being used, and additionally takes account of a certain margin M, for example for errors which are caused by noise or interference and do not originate from the transmitter. This margin M may be a fixed amount, for example a factor of 10 (corresponding to 10 dB), and the maximum permissible error in the transmission signal can be determined using the following formulae:

$$EVM^2 = 1/((C/I)_{min} \cdot M) \text{ or } RCE = 1/((C/I)_{min} \cdot M).$$

Alternatively, the margin may also contain a certain constraint. A constraint such as this may, for example, include the data throughput that is theoretically to be expected (without errors or with errors corrected) for a specific carrier to interference ratio C/I deteriorating only by at most 5% when EVM or RCE occurs.

$$EVM^2 = 1(C/I)_{95\%} - 1/(C/I)_{100\%}.$$

In this case, $(C/I)_{100}\%$ corresponds to the 100% data throughput, and $(C/I)_{95}\%$ corresponds to that which is worse by 5%. The above formulae relate to linear power (not in dB).

This results in the following relative error energy at the receiver of the transmission signal:

$$1/(C/I)_{min} > 1/(C/I) = 1/SNR_{RX} + EVM_{TX}^2$$

For errors which do not originate from the transmitter, $SNR_{RX}$ is scaled directly with the transmission power. In other words, a "loud" transmission signal, for example a mobile radio signal transmitted with a high transmission power, produces a higher $SNR_{RX}$ than a "quiet" transmission signal, for example a mobile radio signal transmitted with low transmission power. Furthermore, the maximum possible (average) transmission power is inversely proportional to the PAR, that is to say a high PAR means a relatively low (average) transmission power since high peaks occur in the transmission signal, while in contrast a low PAR close to 1 allows a high (average) transmission power, since only small peaks occur in the transmission signal. Finally, a PAR which is as low as possible can be achieved when the EVM and RCE may be as high as possible in the transmission signal.

This is now made use of according to the method to optimize the SNR and C/I (Carrier to Interference) which is required for a specific MCS, at the receiver end. In this case, this takes account of the various contributions of which the $EVM_{TX}^2$ is composed at the receiver end (RCE may also be used instead of $EVM^2$):

$$EVM_{TX}^2 = EVM_{Clip}^2 + EVM_{Analog}^2$$

While the error $EVM_{Analog}$ which is produced by the analog transmitter amplifier can be considered to be approximately constant, the error $EVM_{Clip}$ which is produced by the clipping results directly from the limiting of the transmission signal, and depends on the PAR that is achieved.

According to the method, the EVM values can now be matched to the respective radio links, as required. In good reception conditions or for low-priority services, a low transmission power is sufficient, which interferes less with other radio links. In this case, use is made of the freedom for a high PAR and therefore a low EVM, which this low transmission power offers, thus improving the C/I.

First Optimization Approach

A first optimization approach is therefore designed to achieve a minimum transmission power for a fixed C/I. This approach means that $1/SNR_{RX}$ becomes higher. For a fixed $1/(C/I)$, there is therefore virtually no more remaining freedom for $EVM_{TX}^2$. This leads to a higher PAR. In the limit:

$$EVM_{TX} = EVM_{Analog} \text{ and}$$

$$1/(C/I) = 1/SNR_{RX} + EVM_{Analog}^2$$

The first optimization approach is expedient when the relevant radio link is intended to interfere to a minimum extent with other radio links. This is possible, for example, when the transmission power can be reduced because the reception conditions are good.

Second Optimization Approach

When the reception conditions are poor or for high-priority services, the transmission power can be increased for a given peak power. The EVM can be optimized for minimum $1/(C/I)$ for a fixed predetermined peak value to noise ratio (PNR: peak to noise ratio) of the power at the receiver.

A second optimization approach is therefore designed to minimize $1/(C/I)$ for a fixed PNR. The formula for the second optimization approach is as follows:

$$1/(C/I) = 1/SNR_{RX} + EVM^2 = PAR_{TX}/PNR_{RX} + EVM_{TX}^2$$

The second optimization approach is based on a method in which the following are carried out:
(a) Determination of the relationship $EVM^2$ (PAR) at the transmitter
(b) Optimization: Determination of the minimum $1/(C/I)$ for an undefined, fixed $PRN_{RX}$ value
(c) Association of the $EVM^2$ with the C/I from the optimization in b)
(d) Repetition of (b) and (c) for different $PNR_{RX}$ values.

This method makes it possible to determine the relationship between the $EVM^2$ and the required C/I, with optimization being carried out for a minimum $1/(C/I)$ for a radio link. Corresponding devices for carrying out the method may be implemented in the form of hardware or software in the monitoring device for determination of the limit value.

The increase in the transmission power leads to a lower PAR and therefore a higher EVM and allows an improvement in the C/I up to the EVM limit value defined in the second optimization approach. An even higher EVM value than the limit value defined in the second optimization approach can lead to a deterioration in the C/I.

After one of the optimization methods has been carried out, each radio link can be adapted as required by appropriate weighting of the $EVM_{Clip}$ values which were determined from the first or second optimization method. The average transmission power can be determined via the power parameters, and the limiting of the transmission signal can be determined via the limit parameters, from the EVM value or the EVM values.

Third Optimization Approach

In addition, the load level in the radio cell may be included in a weighting of the $EVM_{Clip}$ values. This can be done by a third optimization approach. Alternatively, the third optimization approach can also be carried out autonomously, and for the entire transmission signal. According to the third optimization approach, the radio resources of a radio cell are managed in a central unit in the radio access system. The radio resources may, for example, be a control (scheduler) or radio resource management. The central unit normally estimates the load level in the radio cell by a parameter load (L= 0% ... 100%), in order to decide on appropriate measures for access control (admission control), overload control (congestion control) or sequence control (scheduling).

According to the method, the parameter L can now additionally be used to predetermine the $EVM_{TX}$ of the transmitter. By way of example, one simple algorithm for this purpose is:

$$EVM_{TX} = EVM_{TX,0} + (EVM_{TX,100} - EVM_{TX,0}) \times (L/100\%),$$

where $EVM_{TX,0}$ and $EVM_{TX,100}$ represent the permissible EVM for the minimum load and maximum load, respectively.

Figure 3:
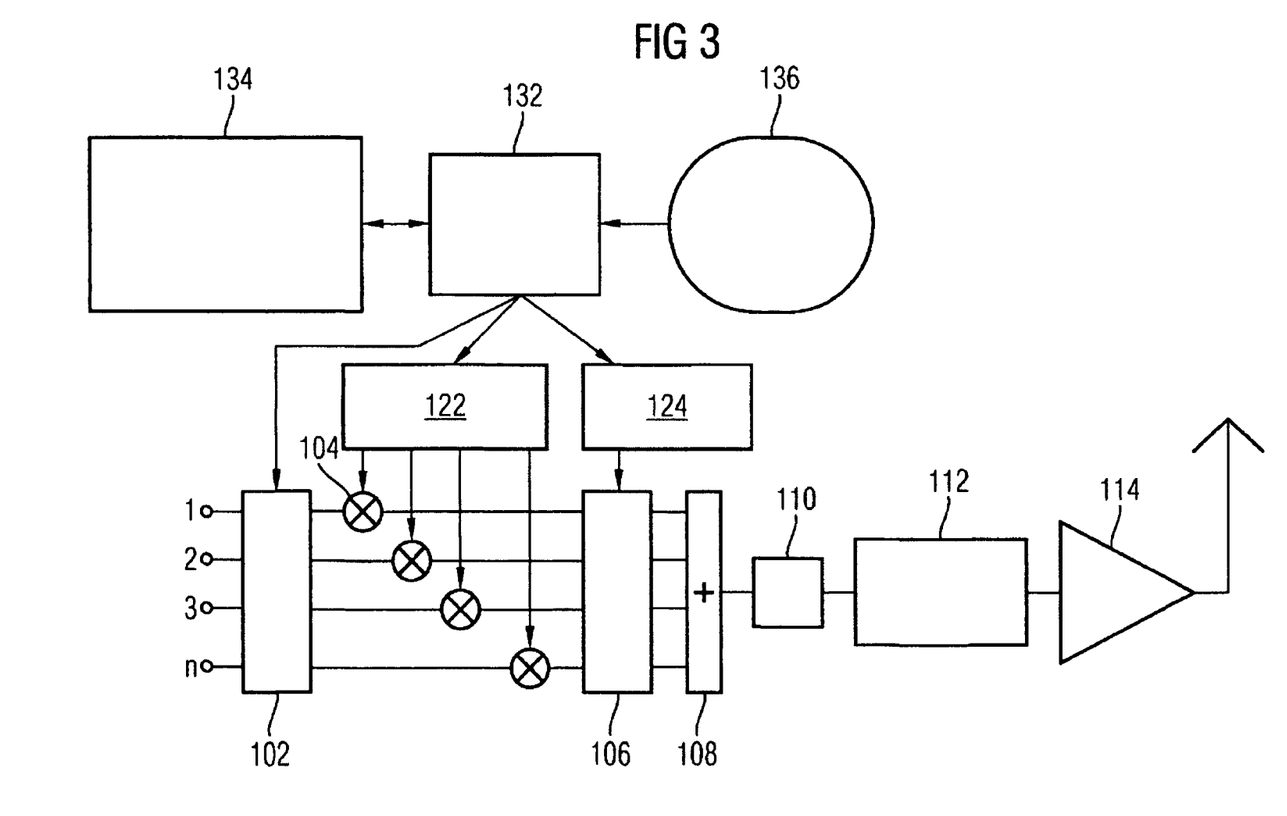
FIG. 3 is a block diagram of an apparatus according to one exemplary embodiment.

The described optimization approaches for determination of the EVM values and the modulation parameters, the power parameters and the limit parameters can be carried out in the monitoring unit 132 that is shown in FIG. 3.

Detailed Description of the Second Optimization Approach

The second optimization approach will now be explained once again in detail. On the assumption of a transmitter (TX) with clipping, a specific EVM and PAR can be observed. EVM describes the ratio between the error $S_E$ and the signal amplitude $S_s$ at the transmitter output, and can be calculated on the basis of the appropriate power values $P_E$ and $P_s$, as follows:

$$EVM = \sqrt{P_E/P_S},$$

where PAR is the peak $(P_p)$ to average $(P_s)$ ratio of the TX signal power:

$$PAR = P_p/P_s$$

The TX signal arrives at the receiver (RX) multiplied by the transmission channel attenuation A. The ratio between this arriving signal power and the RX noise and interference power $P_N$ from all sources except for the appropriate TX source is referred to as the signal to noise ratio SNR.

$$SNR = A \cdot P_S/P_N$$

Assuming that there is no correlation between noise sources, the overall RX-C/I can be calculated using the following equation:

$$\frac{1}{C/I} = A \cdot P_E/(A \cdot P_s) + P_N/(A \cdot P_s) = EVM^2 + 1/SNR$$

The aim is now to maximize C/I.

As is apparent from the above equation, that a maximum TX signal power $P_{s,max}$ maximizes the C/I for a constant EVM. Based on the assumption of the fact that the peak power is limited to a maximum value $P_{P,max}$, PAR defines the maximum achievable (average) TX signal power $P_{S,max}$.

$$P_{S,max} = P_{P,max}/PAR$$

Setting the maximum peak to noise ratio PNR at the receiver to:

$$PNR = A \cdot P_{P,max}/P_N$$

results in the following expression:

$$\frac{1}{C/I(max)} = EVM^2 + P_N/(A \cdot P_{S,max})$$
$$= EVM^2 + P_N/(A \cdot P_{P,max}/PAR)$$
$$= EVM^2 + PAR/PNR$$

Two EVM sources are now assumed: a constant analog component EVM anal and a component $EVM_{clip}$, which depends on the current clipping level. Since the PAR also depends on the clipping level, there is a relationship between PAR and $EVM_{clip}$.

$$EVM^2 = EVM_{anal}^2 + EVM_{clip}^2$$

$$PAR = PAR(EVM_{clip})$$

This results in an equation in which C/I can be maximized.

$$C/I(EVM) = \frac{1}{EVM_{anal2} + EVM_{clip2} + PAR(EVM_{clip})/PNR}$$

Figure 1:
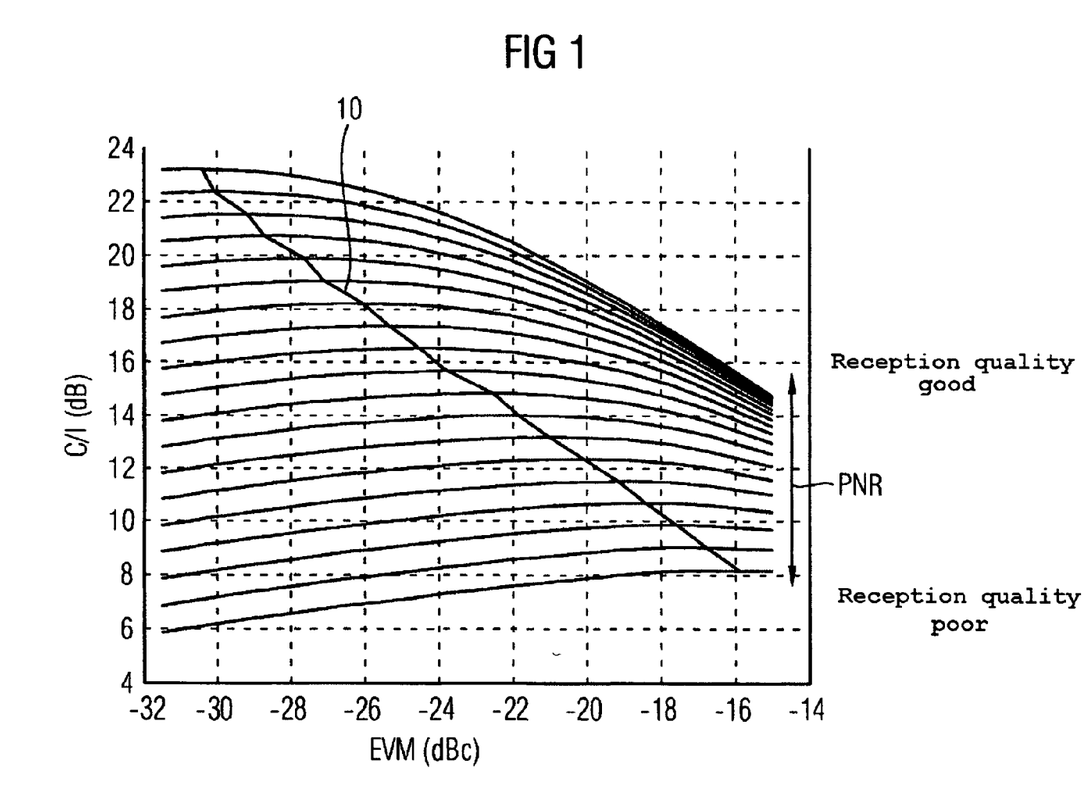
FIG. 1 is a graph depicting simulation results of various C/I(EVM) curves for an assumed $EVM_{anal}$ of 2%.
Figure 2:
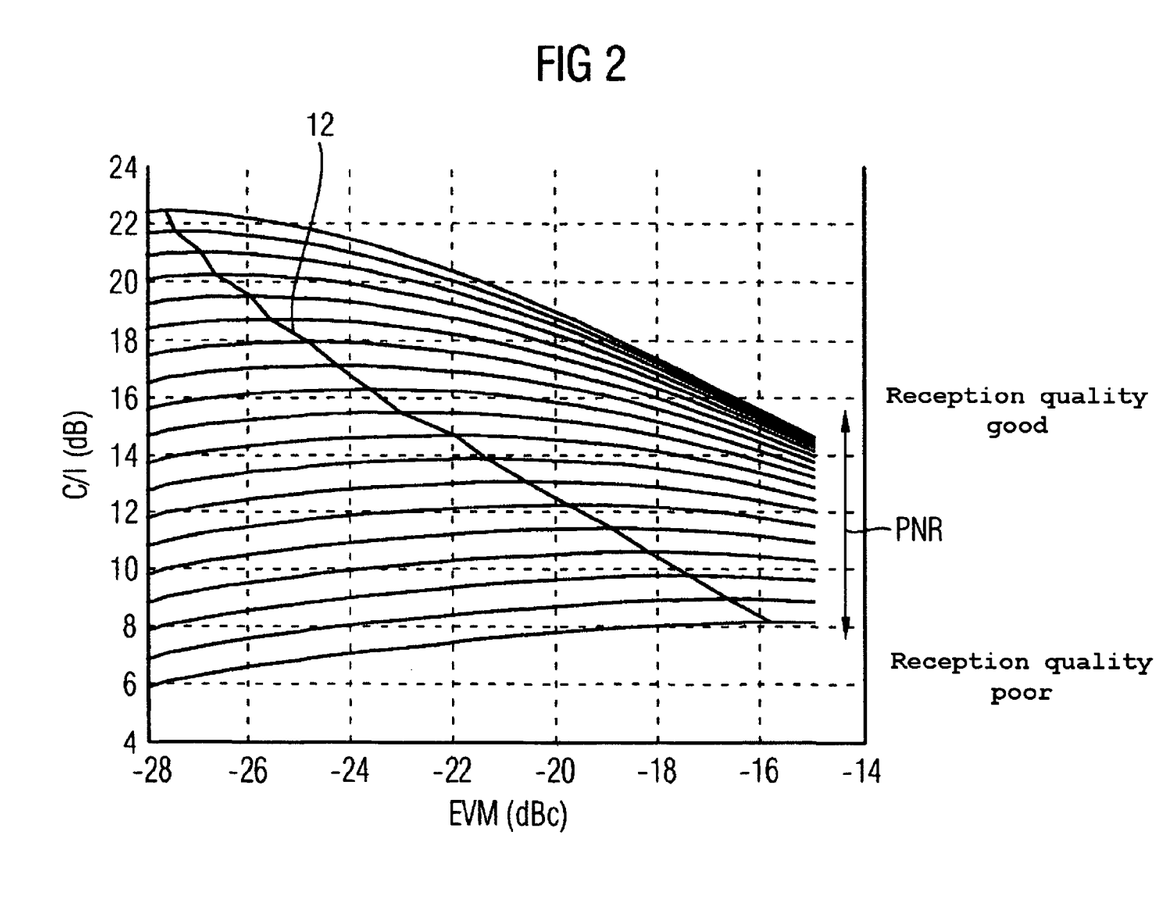
FIG. 2 is a graph depicting simulation results of various C/I(EVM) curves for an assumed $EVM_{anal}$ of 3.5%.

Simulation results based on the above calculations are shown in FIGS. 1 and 2.

FIGS. 1 and 2 show a plurality of curves C/I(EVM), each for one specific PNR value. These curves were calculated from PAR=PAR($EVM_{clip}$) simulation results on the assumption that $EVM_{anal}$=2% (FIG. 1) and 3.5% (FIG. 2) for each clipping level.

The falling lines 10 and 12 in FIGS. 1 and 2 respectively link the individual maxima of the curves C/I(EVM) and characterize the optimum range. An EVM which is greater or less than the value of the line 10 or 12 would result in a lower C/I for a given PNR. However, the C/I discrepancy is not great within a region of a few dB around the optimum EVM.

Nevertheless, EVM values which are greater than the optimum have no point, as long as a higher EVM is associated with a lower PAR and with a higher power. A higher power not only does not improve the C/I any further but also increases intercell (and intracell) interference and radiation. The line 10 or 12, respectively, therefore represents a recommendation for the upper EVM limit for a given C/I.

In the simulation examples for $EVM_{analog}$=2%, the optimum ratio between C/I and EMV is as follows:

$$EVM_{opt}[dBc] = -(C/I[dB] + 8)$$

The resultant SNR requirement is:

$$SNR_{opt}[dB] = C/I[dB] + 0.75$$

The example for $EMV_{anal}$=3.5% (FIG. 2) has a different response. In this case, the EVM has a tendency to be greater in the 2% case (FIG. 1), in particular for higher C/I values. This results in a higher average TX power, and in less stringent SNR requirements.

Exemplary Embodiments of Different Apparatuses

FIG. 3 now shows a block diagram of an apparatus for transmission according to one exemplary embodiment. In particular, FIG. 3 shows a transmission device with interference-optimized setting of the average output power for each individual radio link. In this case shows a highly simplified outline illustration of the transmission device. In particular, details have been omitted relating to the filtering and step-up mixing and relating to the multiple access methods, for example channel spreading or IFFT. Details such as these may be carried out in various ways.

The apparatus for transmission is designed to receive and process a plurality of individual baseband data items. According to this exemplary embodiment, the apparatus is designed to receive baseband data from n lines or links. The apparatus is also designed to transmit the processed baseband data in the form of a transmission signal. The transmission signal may be transmitted via a transmission channel, for example a radio link, and may be received and evaluated by a receiver (not shown in the figures).

The apparatus has a modulation and coding device 102, a plurality of power regulators 104, a limiter 106, a combiner 108, a digital/analog converter 110, a step-up mixer 112 and an amplifier LPA 114. Furthermore, the apparatus has a power control 122, a limiter control 124 and a monitoring unit 132, which is coupled to a memory 134 and to a management unit 136.

The modulation device 102 is designed to receive the baseband data 1–n, to modulate it and to output this as intermediate frequency signals. Furthermore, the modulation device 102 may be designed to code baseband data. The modulation device 102 is designed to receive modulation parameters and coding parameters from the monitoring unit 132, and to code the baseband data on the basis of the received parameters.

For each intermediate frequency signal, the apparatus has a power regulator 104, that is to say a total of n power regulators 104. Each power regulator 104 is designed to regulate the transmission power of the associated signal. For this purpose, each power regulator 104 is designed to receive one or more power parameters from the power control 122, defining a value for the transmission power of the associated signal. The power control 122 is designed to pass the power parameters to all the power regulators 104. The power parameters of the various power regulators 104 may be identical or else different, that is to say they may be individually matched to each subcarrier. The power control 122 is designed to receive the power parameters from the monitoring unit 132. Alternatively, the power control 122 may be designed to receive values from the monitoring unit 132 from which the power control 122 can determine the power parameters.

The limiter 106 is designed to receive the intermediate frequency signals from the power regulators 104, and to limit their amplitude. For this purpose, the limiter 106 may have a so-called clipping algorithm, which limits the intermediate frequency signals on the basis of limit parameters. The limiter 106 is designed to receive the limit parameters from the limit control 124. The limit control 124 is in turn designed to receive the limit parameters from the monitoring unit 132. Alternatively, the limit control 124 may be designed to receive values from the monitoring unit 132, from which the limit control 124 can in turn determine the limit parameters. The limit parameters define the extent to which the intermediate frequency signals are limited.

The combiner 108 is designed to receive the limited intermediate frequency signals from the limiter 106, and to combine them to form an overall signal. The combiner 108 may be an adder.

The digital/analog converter 110 is designed to receive the overall signal from the combiner 108 and to convert it from digital to analog form. The step-up mixer 112 is designed to receive the digitized overall signal from the digital/analog converter 110, to up-mix it and to pass it to the amplifier 114. The amplifier 114 is designed to pass the transmission signal to a transmission antenna, by which the transmission signal can be transmitted.

The monitoring unit 132 may be in the form of radio resource management or radio resource control. The monitoring unit 132 has access to the memory 134 and to the management unit 136. The memory 134 may be in the form of a look-up table LUT. The look-up table can be used to store a relationship between PAR and EVM as well as values for an associated maximum C/I, including MCS, EVM(RCE) and PAR(PAPR). In addition, the table may contain appropriate parameters for the clipping algorithm in the limiter 106. The management unit 136 may contain important influencing factors, such as priority, load level in the radio cell, the reception conditions and guaranteed minimum data rates.

The monitoring unit 132 can determine the optimum parameters for modulation and coding, transmission power and limiting as a function of the transmission factors which are stored in the memory 134 and the management unit 136. This makes it possible to produce a transmission signal which, in the given conditions, results in an optimum C/I at the receiver, thus increasing the data throughput and the range of the apparatus for transmission.

Figure 4:
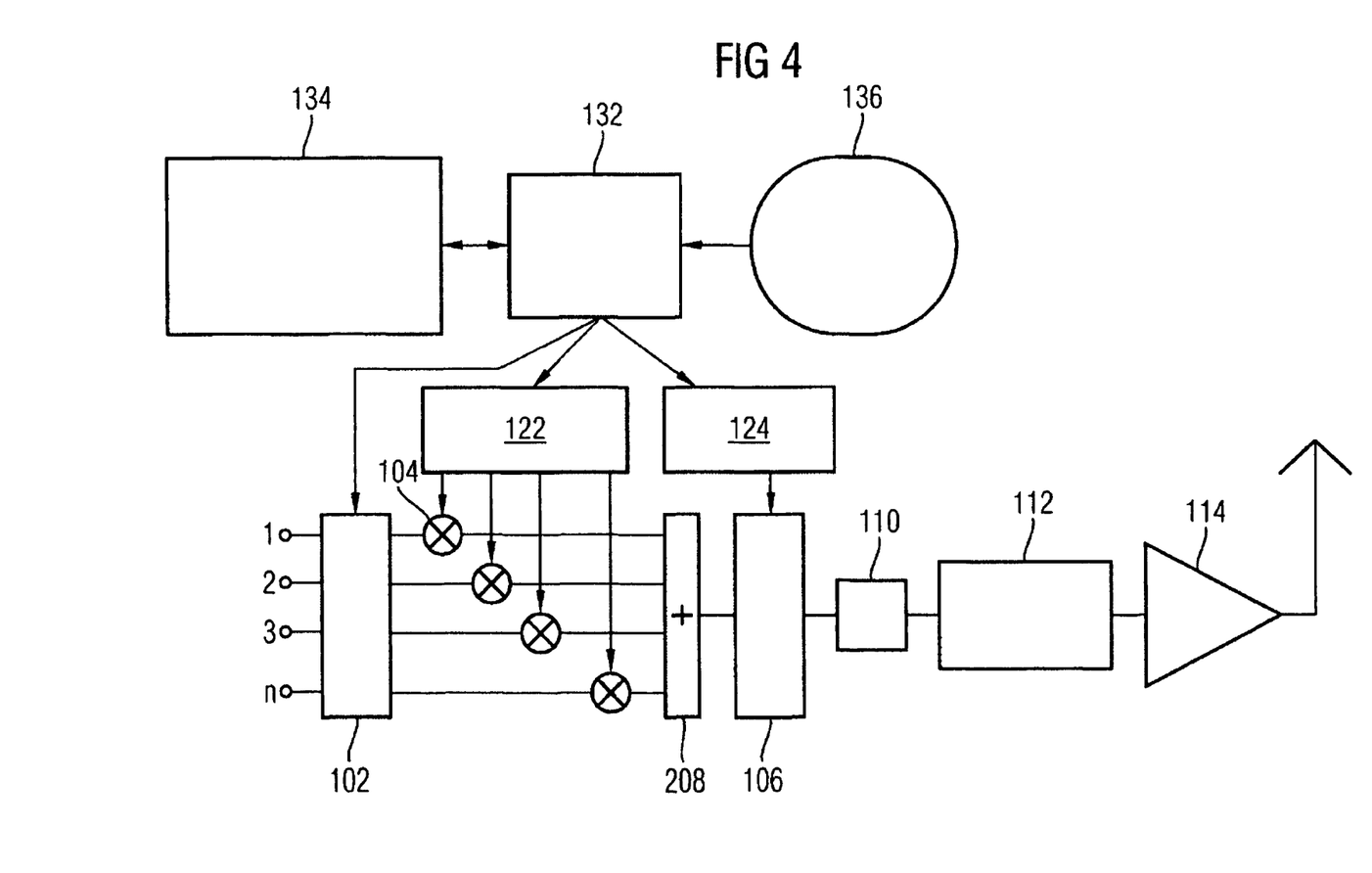
FIG. 4 is a block diagram of an apparatus according to a further exemplary embodiment.

FIG. 4 shows a block diagram of an apparatus for transmission according to a further exemplary embodiment. In particular, and in contrast to the exemplary embodiment shown in FIG. 3, FIG. 4 shows an alternative embodiment with joint power limiting (clipping).

In contrast to the apparatus for transmission as shown in FIG. 3, the apparatus for transmission as shown in FIG. 4 has a combiner 208 arranged between the power regulators 104 and the limiter 106. The combiner 208 may in turn be in the form of an adder, which receives the individual intermediate frequency signals from the power regulators 104, combines them and passes them as an overall signal to the limiter 106. According to this exemplary embodiment, the limiter 106 is designed to limit the amplitude of the overall signal received by the combiner 208, and to pass it to the digital/analog converter 110.

Figure 5:
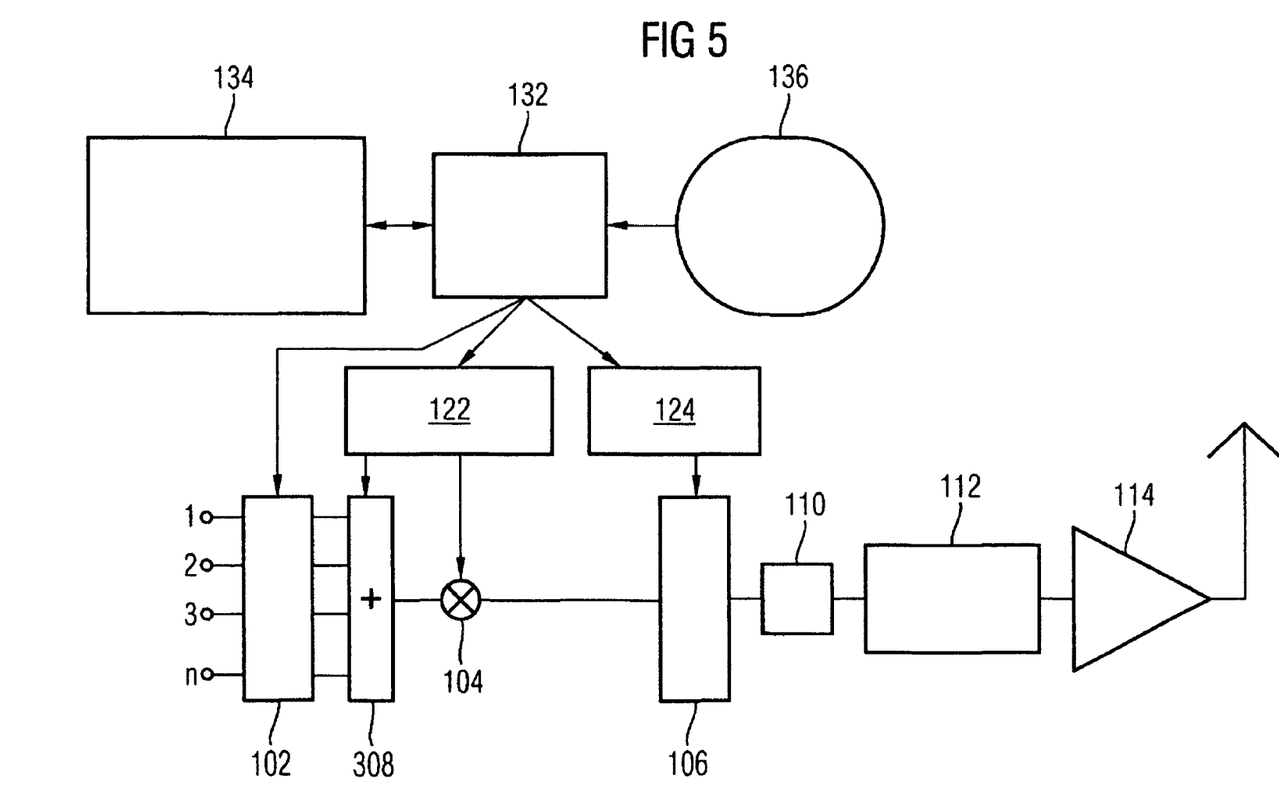
FIG. 5 is a block diagram of an apparatus according to a further exemplary embodiment.

FIG. 5 shows a block diagram of an apparatus for transmission according to a further exemplary embodiment. In particular, FIG. 5 shows an alternative embodiment with joint power regulation and joint power limiting.

In contrast to the apparatus for transmission as shown in FIG. 3, the apparatus for transmission as shown in FIG. 5 has a combiner 308 arranged between the modulation device 102 and a single power regulator 104. The combiner 308 may in turn be in the form of an adder, which receives the intermediate frequency signals produced by the modulation device 102, combines them and passes them as an overall signal to the power regulator 104. The power regulator 104 is designed to regulate and to set the transmission power of the overall signal and to pass the overall signal, whose transmission power is regulated or set, to the limiter 106.

Figure 6:
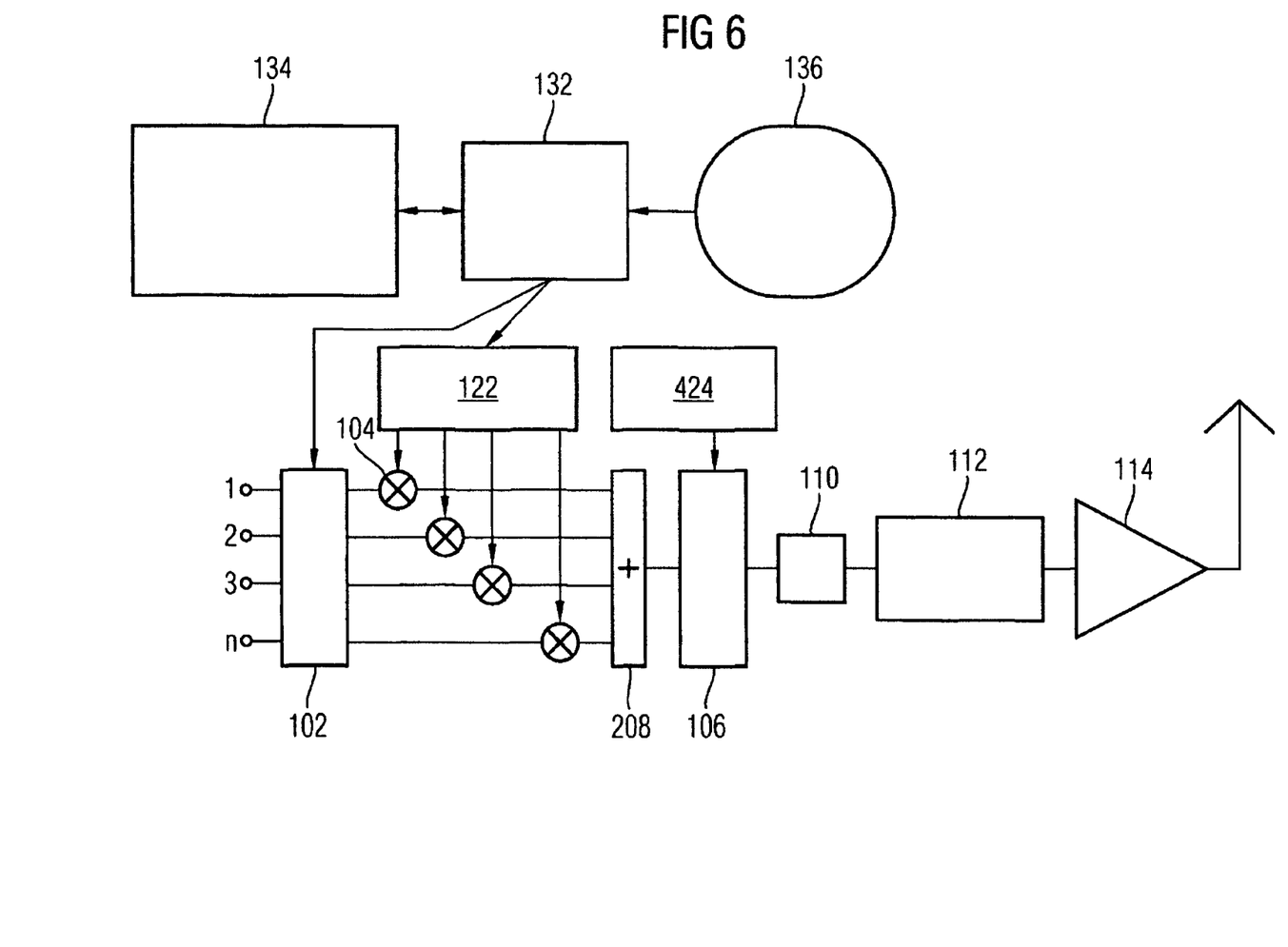
FIG. 6 is a block diagram of an apparatus according to a further exemplary embodiment.

FIG. 6 shows a block diagram of an apparatus for transmission according to a further exemplary embodiment. In particular, FIG. 6 shows an alternative embodiment with fixed limit parameters.

In contrast to the apparatus for transmission shown in FIG. 4, the limit parameters according to the exemplary embodiment shown in FIG. 6 are not passed from the monitoring unit 132 to the limit control 124. In fact, the limit control 124 already has appropriate limit parameters. The limit parameters may be predefined. There is also therefore no need for these limit parameters to be stored in the memory 134, as may be the case in the previous exemplary embodiments.

The description above has been with reference to mobile radio transmission systems, but should not be restricted to systems such as these. In fact, the approach described herein can be used for all transmission systems in which it is desirable to adapt a signal on the basis of variable transmission conditions.

Figure 9:
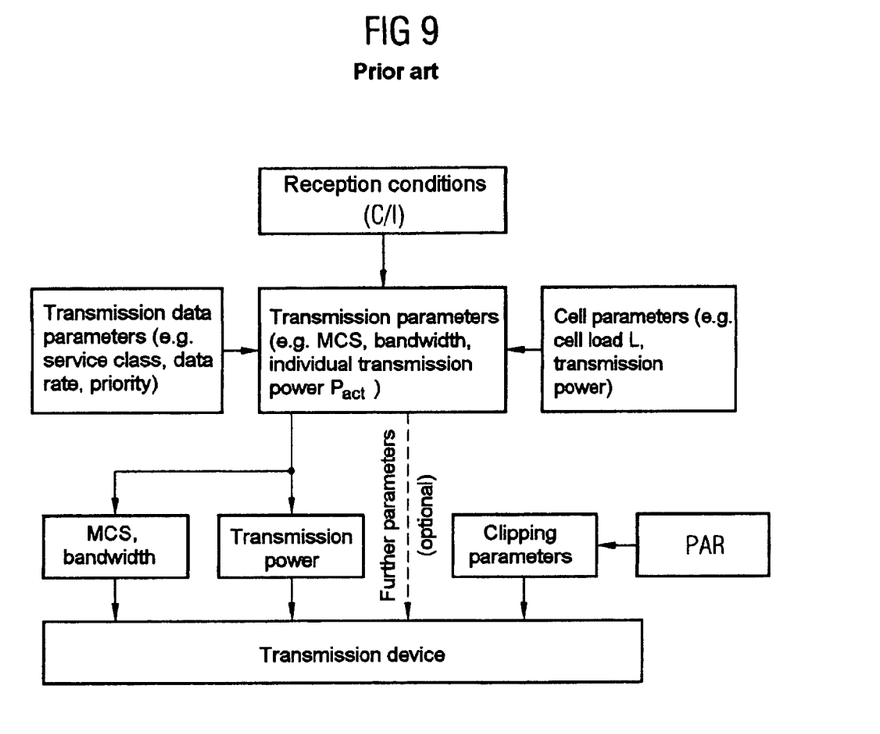
FIG. 9 is a flowchart for the setting of parameters of a mobile radio transmission device according to the related art.

FIG. 9 uses a flowchart to show the setting of the parameters MCS, transmission power and clipping parameters of a mobile radio transmission device according to the related art. Furthermore, other transmission parameters of a mobile radio transmission device can also be set. The MCS and the transmission power are in this example defined by the transmission data parameters, for example the service class, the data rate, and the priority.

Furthermore, the setting of the parameters MCS, bandwidth and transmission power includes the reception conditions in the form of the carrier to interference ratio C/I as well as cell parameters of a mobile radio cell, such as the cell load L and the transmission power in the cell. As can be seen in FIG. 9, the clipping parameters are set independently of the other parameters, on the basis of the chosen PAR.

Figure 7:
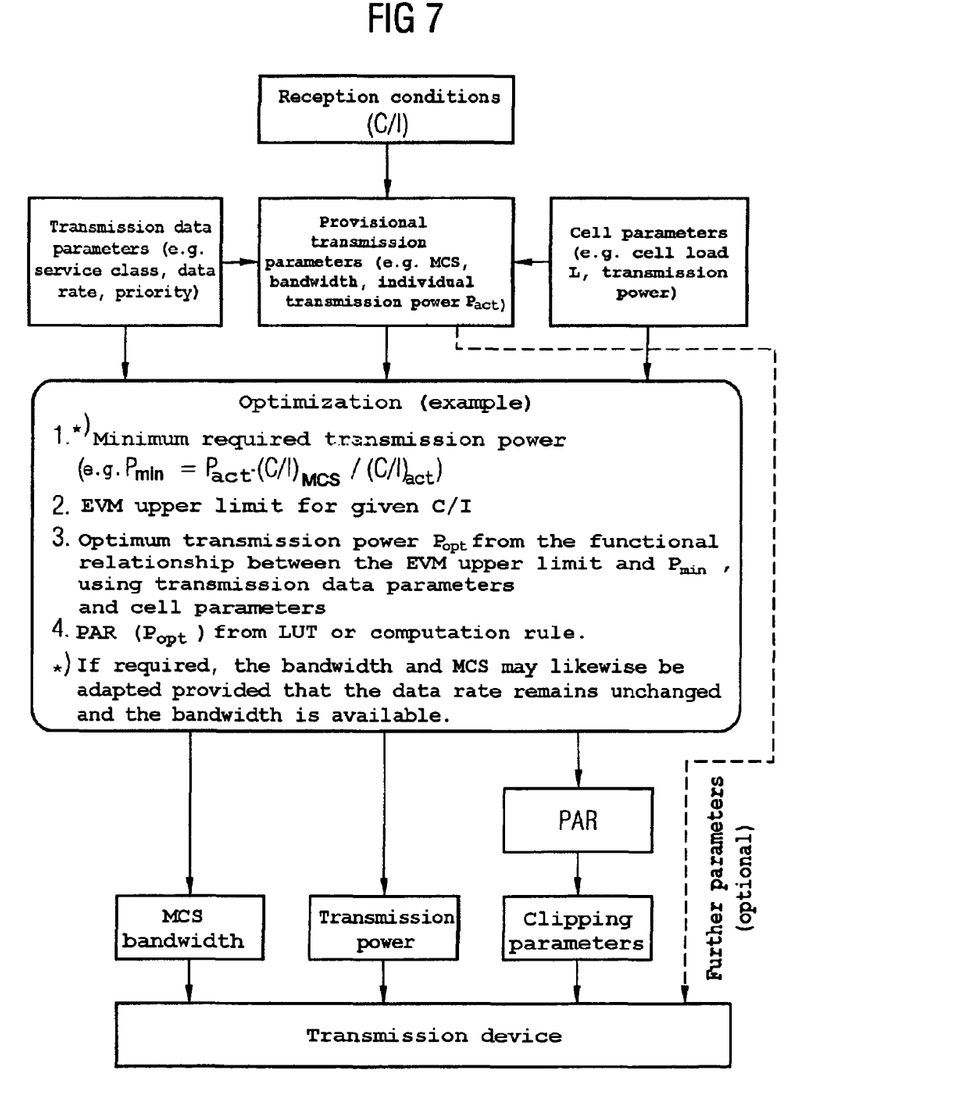
FIG. 7 is a first flowchart for setting of parameters of a mobile radio transmission device, with optimization.
Figure 8:
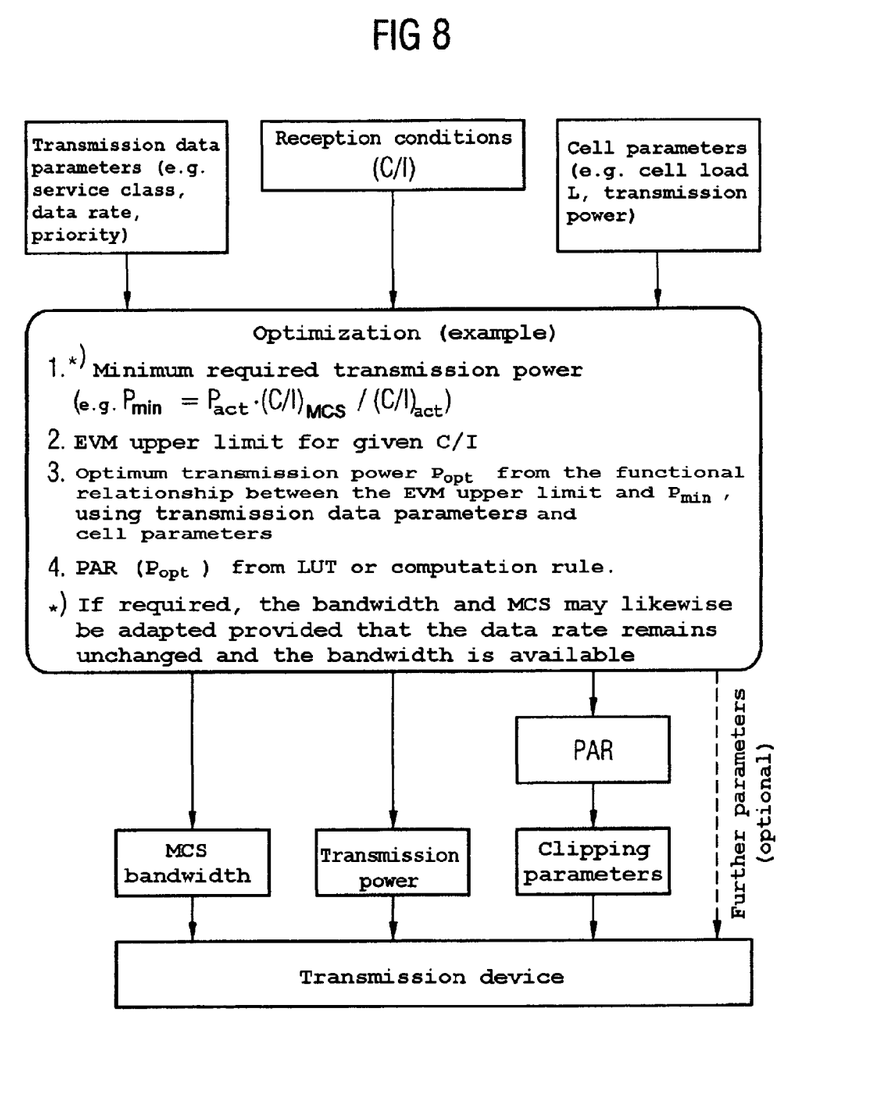
FIG. 8 is a second flowchart for setting of parameters of a mobile radio transmission device, with optimization.

In contrast to this, FIGS. 7 and 8 show flowcharts in which optimization is carried out during the setting of parameters of a mobile radio transmission device. The optimization process is carried out identically in both the illustrated procedures, with the only difference being the input parameters for optimization.

An optimization process is carried out as follows:

1. First of all, a minimum required transmission power $P_{min}$ is determined, for example $P_{min} = P_{act} (C/I)_{MCS}/(C/I)_{act}$, where $(C/I)_{act}$ is the C/I measured for the current transmission power $P_{act}$, and $(C/I)_{MCS}$ is the C/I associated with the current MCS. If required, the bandwidth and the MCS can also be adapted, as long as the data rate is unchanged and the bandwidth is available.
2. An EVM upper limit is then defined for a given C/I. This upper limit can be determined by the relationship of the curves 10 and 12 in FIGS. 1 and 2.
3. The optimum transmission power $P_{opt}$ is then determined by a functional relationship from $P_{min}$ and the EVM upper limit, using the maximum available peak transmission power $P_{p,max}$ as well as transmission data parameters and cell parameters. This function can also be stored in a table.
4. Finally, the PAR is determined from the optimum transmission power ($P_{opt}$) on the basis of a look-up table (LUT) or a computation rule.

The optimization process results in the parameters MCS, bandwidth, transmission power and PAR, which are set appropriately in the mobile radio transmission device.

Instead of the parameter $P_{min}$, it is also possible to use a different parameter, which corresponds to the settings for a minimum required performance. It is likewise possible to choose a parameter which represents the settings for optimum performance, for the EVM upper limit.

In a further embodiment option, the parameters which are relevant for clipping may also be calculated directly, without the use of $P_{opt}$ and/or PAR.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for transmission of a transmission signal, as a mobile radio signal, to a receiver, where the transmission signal is processed in accordance with a modulation coding scheme and is subjected to amplitude limiting to achieve a ratio between a maximum transmission power and an average transmission power, where an error limit value for an error in the transmission signal is matched as required to transmission conditions for the transmission signal, and where one transmission condition is a carrier to interference ratio to be maximized at the receiver for a fixed predetermined peak value to noise ratio, comprising:
   determining an optimum limit value for an error in the transmission signal by
      determining a relationship between the error in the transmission signal and a predetermined ratio of the maximum transmission power to the average transmission power in a transmitter;
      determining a maximum carrier to interference ratio at the receiver and the error in the transmission signal associated therewith for an undefined, fixed peak value to noise ratio at the receiver;
      associating the error in the transmission signal associated with the maximum carrier to interference ratio as a maximum limit value for the maximum carrier to interference ratio at the receiver; and
      repeating said determining of the maximum carrier to interference ratio and said associating for different peak value to noise ratios;
   estimating a load level in a radio cell using a parameter load between 0% and 100%, to decide on appropriate measures for access control, overload control or sequence control; and
   presetting the error limit value for an error of the transmitter defined as $EVM_{TX}$ using the parameter load.

2. The method as claimed in claim 1, further comprising obtaining the error limit value for $EVM_{TX}$ as $EVM_{TX,0}+(EVM_{TX,100}-EVM_{TX,0}) \times (L/100\%)$, where $EVM_{TX,0}$ and $EVM_{TX,100}$ represent a permissible error limit value for a minimum load and maximum load, respectively.

3. An apparatus for transmission of a transmission signal to a mobile radio receiver, comprising:
   at least one power regulator regulating transmission power of an intermediate frequency signal from which the transmission signal can be produced, as a function of a power parameter;
   a limiter limiting the transmission power of the intermediate frequency signal as a function of a limit parameter;
   a monitoring unit
      determining a limit value for an error in the transmission signal as a function of transmission factors,
      determining at least the power parameter from the limit value such that the transmission signal is matched to the limit value, where one transmission condition is a carrier to interference ratio to be maximized at the receiver for a predetermined peak value to noise ratio; and
      determining a relationship between a square of the limit value and a required carrier to interference ratio, by
      determining a relationship between the square of the limit value and a ratio of maximum transmission power to average transmission power for the apparatus,
      determining a maximum carrier to interference ratio for a predetermined peak to noise ratio at the receiver,
      associating the limit value squared with a signal to noise ratio from the maximum carrier to interference ratio, and
      repeating said determining of the maximum carrier to interference ratio and said associating, for different peak to noise ratios at the receiver.

4. The apparatus as claimed in claim 3, wherein said monitoring unit also determines the limit parameter such that the transmission signal is matched to the limit value.

5. The apparatus as claimed in claim 4,
   further comprising a modulator modulating a baseband signal as a function of a modulation parameter and producing the baseband signal as the intermediate frequency signal, and
   wherein said monitoring unit also determines the modulation parameter from the limit value.

6. The apparatus as claimed in claim 5, further comprising:
   a digital/analog converter;
   a step-up mixer; and a transmission amplifier, in order to produce the transmission signal from the intermediate frequency signal.

7. The apparatus as claimed in claim 6,
   wherein an optimization rule is based on a relative error energy at the receiver determined according to $1/(C/I)_{min} > 1/(C/I) = 1/SNR_{RX} + EVM_{TX}^2$, where $(C/I)_{min}$ is a minimum required carrier to interference ratio, C/I is the carrier to interference ratio, $SNR_{RX}$ is the signal to noise ratio at the receiver, and $EVM_{TX}$ is the limit value in the apparatus for transmission, and
   wherein the signal to noise ratio at the receiver for errors which do not originate from the apparatus is scaled directly with an average transmission power of the transmission signal.

8. The apparatus as claimed claim 7,
   wherein one of the transmission factors is the average transmission power of the transmission signal, and
   wherein the optimization rule results in a reduction in the limit value when the average transmission power is reduced and an increase in the limit value when the average transmission power is increased.

9. The apparatus as claimed in claim 8, further comprising determining the limit value in accordance with the optimization rule to achieve a maximum carrier to interference ratio for a predetermined peak to noise ratio using $1/(C/I)=1/SNR_{RX}+EVM^2=PAR_{TX}/PNR_{RX}+EVM_{TX}^2$, where $PAR_{TX}$ is a ratio of the maximum transmission power to the average transmission power, and $PNR_{RX}$ is a peak to noise ratio at the receiver.

10. The apparatus as claimed in claim 9, further comprising a memory, coupled to said monitoring unit, storing a relationship between a ratio of the maximum transmission power to the average transmission power, the limit value for the maximum permissible error in the transmission signal, and values for an associated maximum carrier to interference ratio.

11. The apparatus as claimed in claim 8, further comprising a memory, coupled to said limiter, storing limit parameters provided to said limiter.

12. The apparatus as claimed in claim 8, wherein the apparatus is disposed in a radio cell, and
wherein the apparatus further comprises a management unit estimating a load level of the radio cell and outputting the load level to said monitoring unit as a transmission factor.

13. The apparatus as claimed in claim 12, further comprising determining the limit value by $EVM_{TX} = EVM_{TX,0} + (EVM_{TX,100} - EVM_{Tx,0}) \times (L/100\%)$, where $EVM_{Tx,0}$ is a permissible limit value for minimum load, $EVM_{TX,100}$ is a permissible limit value for maximum load, and L is a load level in the radio cell.

14. The apparatus as claimed in claim 13,
wherein said modulator modulates a plurality of baseband signals as a function of a plurality of modulation parameters to produce as a plurality of intermediate frequency signals, and
wherein said monitoring unit determines the plurality of modulation parameters from the limit value.

15. The apparatus as claimed in claim 14, further comprising a combiner combining the plurality of intermediate frequency signals to produce an intermediate frequency signal output to said at least one power regulator.

16. The apparatus as claimed in claim 14,
wherein said at least one power regulator includes a plurality of power regulators regulating respective transmission powers of the plurality of intermediate frequency signals as a function of a plurality of power parameters, and
wherein said monitoring unit determines the plurality of power parameters from the limit value.

17. The apparatus as claimed in claim 16, further comprising a combiner combining the plurality of intermediate frequency signals to produce the intermediate frequency signal output to the limiter.

18. The apparatus as claimed in claim 17, wherein said limiter uses a predefined limit parameter.

19. The apparatus as claimed in claim 18, wherein said limiter limits respective transmission powers of the plurality of intermediate frequency signals as a function of a plurality of limit parameters, and outputs a plurality of transmission signals.

* * * * *

UNITED STATES PATENT AND TRADEMARK OFFICE
CERTIFICATE OF CORRECTION

PATENT NO. : 8,467,746 B2  
APPLICATION NO. : 12/449178  
DATED : June 18, 2013  
INVENTOR(S) : Baumgartner et al.

Page 1 of 1

It is certified that error appears in the above-identified patent and that said Letters Patent is hereby corrected as shown below:

In the Claims:

Column 14, Line 56, In Claim 8, after "claimed" insert -- in --.

Column 15, Line 19-20, In Claim 13, first occurrence, delete "EVMTx,0)" and insert -- EVMTX,0) --, therefor.

Column 15, Line 20, In Claim 13, second occurrence, delete "EVMTx,0" and insert -- EVMTX,0 --, therefor.

Signed and Sealed this  
Tenth Day of September, 2013

Teresa Stanek Rea  
*Acting Director of the United States Patent and Trademark Office*